(12) United States Patent
Malatier

(10) Patent No.: US 6,389,698 B1
(45) Date of Patent: May 21, 2002

(54) METHOD FOR MAKING A MOTOR CAR BODY

(75) Inventor: François Malatier, Taverny (FR)

(73) Assignee: ABB Body in White, Beauchamp (FR)

( * ) Notice: Subject to any disclaimer, the term of this patent is extended or adjusted under 35 U.S.C. 154(b) by 0 days.

(21) Appl. No.: 09/700,749

(22) PCT Filed: Jun. 1, 1999

(86) PCT No.: PCT/FR99/01280

§ 371 Date: Nov. 20, 2000

§ 102(e) Date: Nov. 20, 2000

(87) PCT Pub. No.: WO99/64289

PCT Pub. Date: Dec. 16, 1999

(30) Foreign Application Priority Data

Jun. 9, 1998 (FR) .......................................... 98 07223

(51) Int. Cl.⁷ .............................................. B21D 53/88
(52) U.S. Cl. ...................... 29/897.2; 29/466; 29/559; 29/281.1; 29/281.6; 269/289 R; 269/303; 269/305
(58) Field of Search ............................ 29/897.2, 464, 29/466, 791, 795, 787, 783, 281.1, 281.6, 281.5; 269/559, 289 R, 303, 305; 219/86.1, 86.24, 158; 228/49.1, 49.6

(56) References Cited

U.S. PATENT DOCUMENTS

| | | | | | |
|---|---|---|---|---|---|
| RE15,203 E | * | 10/1921 | Nicoson | ...................... | 269/305 |
| 4,538,044 A | * | 8/1985 | Kadowaki et al. | ........ | 219/86.24 |
| 4,667,866 A | * | 5/1987 | Tobita et al. | ............... | 228/49.1 |
| 4,751,995 A | * | 6/1988 | Naruse et al. | ............... | 29/281.6 |
| 4,759,489 A | * | 7/1988 | Pigott | ......................... | 228/49.1 |
| 4,951,931 A | * | 8/1990 | Rossi | .......................... | 269/305 |
| 4,973,817 A | | 11/1990 | Kanno et al. | | |
| 5,940,961 A | * | 8/1999 | Parete | .......................... | 29/787 |
| 5,943,768 A | * | 8/1999 | Ray | .............................. | 29/791 |

FOREIGN PATENT DOCUMENTS

| | | | |
|---|---|---|---|
| JP | 2-14984 | * | 1/1990 |
| JP | 5-38584 | * | 2/1993 |
| JP | 6-55294 | * | 3/1994 |
| WO | 95/19868 | | 7/1995 |

* cited by examiner

*Primary Examiner*—I Cuda Rosenbaum
*Assistant Examiner*—T. Nguyen

(57) ABSTRACT

A method of making car bodywork, the method including a step of assembling body sides (4*a*, 4*b*) to an underbody (1), the underbody (1) including a rigid engine compartment (2) at one end and being placed in an assembly station in a precise position determined in an orthogonal frame of reference having directions X, Y, and Z, the method consisting: in putting the body sides (4*a*, 4*b*) into position and holding them in position in the frame of reference of the station by means of two parallel tools (13, 14) each co-operating with a respective body side (4*a*, 4*b*), and at least one transverse tool (11) extending transversely to said parallel tools, the three tools being connected to one another and to the X, Y, Z frame of reference of the station in such a manner that the transverse tool (11) is placed and held in a position that is precise and locked in the frame of reference and that it forms a spacer and bracing tool in the Y direction for the two parallel tools (13, 14) in a zone that is remote from the engine compartment (2) of the underbody (1); and in maintaining a force (F) pressing each of the parallel tools (13, 14) at least against the sides of the engine compartment (2) of the underbody (1) while the body sides are being assembled to the underbody.

5 Claims, 2 Drawing Sheets

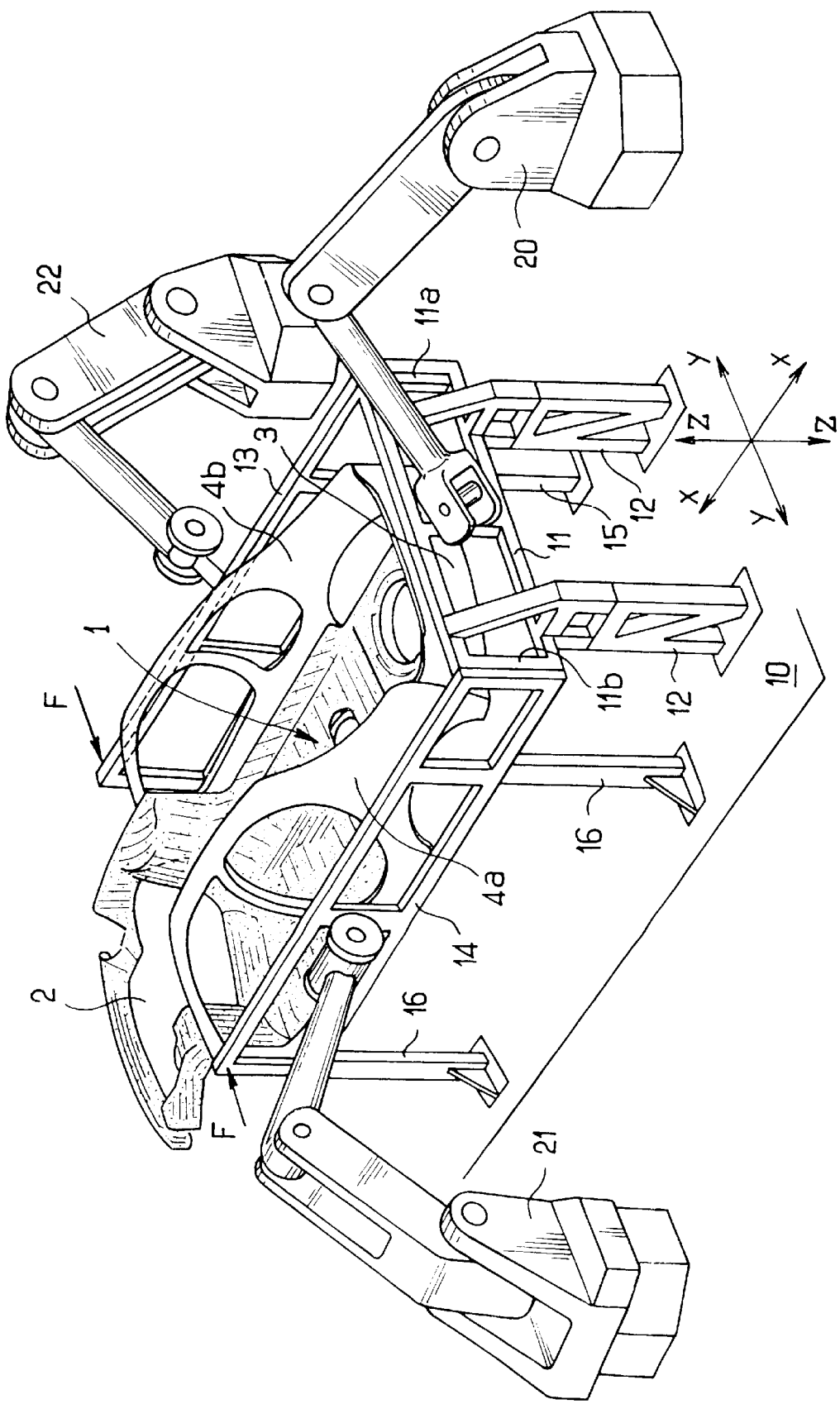

METHOD FOR MAKING A MOTOR CAR BODY

This application is the national phase under 35 U.S.C. §371 of PCT International Application No. PCT/FR99/01280 which has an International filing date of Jun. 1, 1999, which designated the United States of America.

The present invention relates to a method of making car bodywork, the method enabling the tooling used in assembly stations to be as lightweight as possible so as to enable robots to be used as the tools for setting up the bodywork in a welding station and/or the tools for handling bodywork subassemblies that are to be assembled together.

BACKGROUND OF THE INVENTION

In present assembly lines for assembling car bodywork, the subassemblies are positioned relative to one another and relative to the welding robots by means of tooling that is rigid and heavy. By their very nature, bodywork pieces are deformable when subjected to stresses and the tooling used for making bodywork of determined and reproducible shape performs two functions: firstly it constitutes reinforcement for each deformable subassembly so as to stiffen it, and secondly it constitutes a stable interface enabling accurate positioning to be performed in a fixed frame of reference related to the welding robots.

More precisely, two large families of assembly station are known where motor vehicle bodywork parts are welded together. In the first family, tacked-together bodywork parts are fed into a station and tools hold the bodywork in shape. In the second family, bodywork is brought to a station in the form of subassemblies on frames, and they are held in position either as before by tools belonging to the welding stations, or else by the frames being interlocated relative to one another on a base which is itself referenced in the welding station.

To illustrate the main subassemblies constituting vehicle bodywork, reference can be made to FIG. 1 which shows an underbody 1 forming the bottom structure of the bodywork with an engine compartment 2 at the front which is a box-like structure possessing considerable rigidity.

Another subassembly is constituted by a rear lower panel 3 for fixing to the underbody and to the rear portions of two body sides such as 4 (only one side is shown in FIG. 1), the body sides being also assembled to the sides of the underbody 1. On top, a fourth group of elements comprising a roof panel 5 and two cross-members 6 and 7 extends between the two body sides, and more exactly between the two top portions of the body sides such as 4, which portions are known as "cant rails".

In the first family, the assembly shown is preassembled and reaches the welding station on a base which supports the underbody 1 in referenced manner. The tools for holding the body in shape are then constituted by frames which are moved up to said structure in order to be coupled thereto and which are simultaneously held in identified positions either in an overall structure or else by interlocking.

In the second family, the underbody is brought to the welding station on its own on a base in which its position is referenced, and which is itself placed with precision in the frame of reference of the station, after which the other subassemblies are brought in, each associated with a frame (generally having clamps for securing the subassemblies), which frames are either assembled to the base and positioned relative thereto by means of external tools belonging to a general structure, or else they are mutually interlocked so as to form an undeformable "rigid" box in which the subassemblies are in the correct positions relative to one another and relative to the welding robot, ready to be welded together.

The major drawback of such welding stations lies in the considerable weight and size of the tooling for holding the bodywork in shape, which tooling firstly obstructs access for the welding robots and secondly, and above all, requires handling means that must necessarily be robust and therefore likewise bulky. At present it is not possible for this handling to be performed by robots since it is known that the maximum load which robots can carry is no greater than 250 kg to 350 kg.

OBJECTS AND SUMMARY OF THE INVENTION

The present invention stems from the observation whereby the greatest difficulty in setting up the shape of motor vehicle bodywork lies at the end of the underbody remote from the engine compartment, i.e. a location where the underbody is itself relatively deformable. In contrast, beside the engine compartment of the underbody, it has been found that it can be helpful, or even sufficient, to take advantage of its stiffness given that the engine compartment is in the form of a box structure that is practically undeformable, at least in association with the forces used to hold the assembled subassemblies in a welding station before or during welding.

The present invention thus provides a method of making car bodywork, the method including a step of assembling body sides to an underbody, the underbody including a rigid engine compartment at one end and being placed in an assembly station in a precise position determined in an orthogonal frame of reference having directions X, Y, and Z, the method consisting in putting the body sides into position and holding them in position in the frame of reference of the station by means of two parallel tools each co-operating with a respective body side, and at least one transverse tool extending transversely to said parallel tools, the three tools being connected to one another and to the X, Y, Z frame of reference of the station in such a manner that the transverse tool is placed and held in a position that is precise and locked in the frame of reference and that it forms a spacer and bracing tool in the Y direction for the two parallel tools in a zone that is remote from the engine compartment of the underbody, the method also consisting in maintaining a force pressing each of the parallel tools at least against the sides of the engine compartment of the underbody while the body sides are being assembled to the underbody.

The transverse tool can be fixed and held in a position that is accurate and locked in the frame of reference of the station in various ways. Thus, the tool can be placed in receiver members belonging to the station (or to the underbody support) so that all of its degrees of freedom are immobilized. The parallel tools do not participate in this holding. In another case, they can participate in holding it in this way, e.g. by being immobilized in the X and Z directions in the frame of reference, the transverse tool being immobilized solely in the Y direction and co-operating with the parallel tools so as to be immobilized in the X and Z directions. Numerous variants can be found for implementing this fixing and holding of the transverse tool without going beyond the ambit of the invention.

The method is applicable to both of the two large families of car bodywork assembly methods. When the two body sides reach the welding station preassembled to the underbody, one way of proceeding could be as follows: the transverse tool is brought up to the preassembled bodywork to take charge of the rear lower panel, if one exists, and then be completely immobilized in the frame of reference of the station; thereafter parallel side tools are brought up to the body sides which they take in charge and stiffen by means of clamps they have for this purpose in conventional manner, and they are then immobilized in the X and Z directions on supports belonging to the station, or for one or other of these directions of immobilization by means of the transverse tool, and in the Y direction by co-operation with the transverse tool via one end while thrust means are implemented towards the other end close to the engine compartment to press the body sides against said compartment. The thrust means can be constituted by a simple actuator extending between the station and each of the side tools while being capable of being retracted at the time said tools dock or are withdrawn.

In some bodywork, there is no rear lower panel; thus the transverse tool serves solely to serve as a bearing spacer and brace for the parallel tools at the rear of the bodywork.

In the second family of assembly stations, the tools constitute supports for the rear lower panel and the body sides, for example, and they are brought into the welding station carrying their subassemblies, and once in the welding station they are put into place, e.g. in the manner mentioned above.

In certain applications, in the event of the stiffness of the engine compartment being judged to be insufficient, or in order to avoid excessive compression of the engine compartment between the side tools it can be advantageous to provide for the two side tools to be fitted near their ends close to the engine compartment with mutual bearing elements that come into contact with one another under the effect of Y direction thrust to which they are subjected. These bearing elements can include locked connection means capable of relieving the thrust actuators from the effect of any forces on the bodywork tending to move the body sides apart from each other.

BRIEF DESCRIPTION OF THE DRAWINGS

Other characteristics and advantages appear from the following description of an embodiment of the invention given by way of example.

Reference is made to the accompanying drawings, in which, given that FIG. 1 shows a typical vehicle bodywork structure:

FIG. 3 is a diagrammatic view of an assembly and welding station in which the method of the invention is implemented.

MORE DETAILED DESCRIPTION

Figure 2:
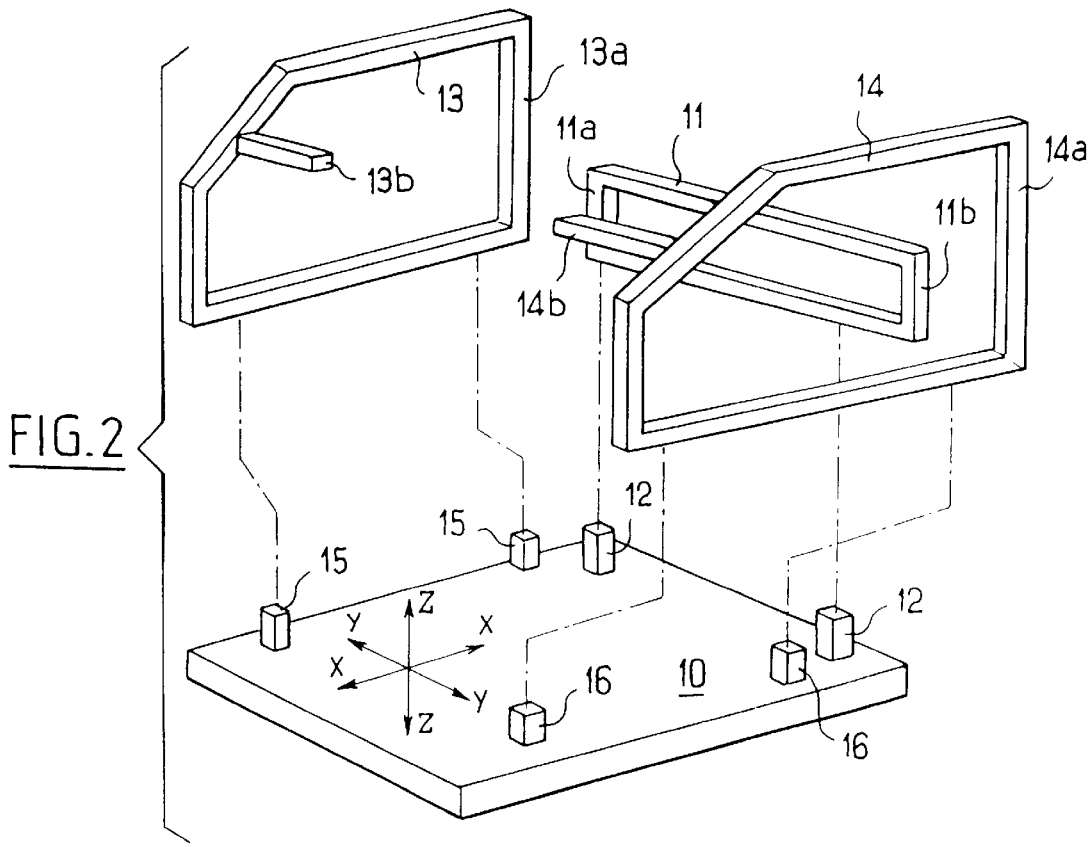
FIG. 2 is a diagram for illustrating the method of the invention.

FIG. 2 shows a fixed structure 10 of a station for assembling vehicle bodywork and possessing a frame of reference X, Y, Z. A support for the underbody 1 of a motor vehicle body can be brought into the structure. The means for bringing in the support and putting it into the position in the X, Y, Z frame of reference are known per se and they are not shown. For example, the support can be constituted by a pallet which travels by means of a conveyor passing through the structure 10 along the X direction, lifting means being provided in the structure to separate the pallet from the conveyor and to put it in a reference position in the X, Y, Z frame of reference. A tool that is transverse in the meaning of the invention is represented in the form of a frame 11 extending transversely to the X direction and suitable for being coupled to the structure 10, e.g. via support studs 12, these studs and the frame 11 being provided with means for co-operating so as to ensure that the frame 11 is immobile in the X, Y, and Z directions such that all six degrees of freedom of the frame relative to the station are eliminated (three degrees in translation along X, Y, and Z, and three degrees in rotation about said directions). Parallel side tools in the form of frames 13 and 14 can then be placed in the structure 10. These side tools rest respectively on studs 15 and 16 which fix them in position in the Z direction, and they have their rear uprights 13a and 14a pressed against the vertical uprights 11a and 11b of the frame 11, thereby fixing their positions in the Y direction, at least at their rear ends. Between the uprights 11a, 11b, 13a, and 14a, there can be provided locking means which hold the frames 13 and 14 in a vertical position where they are spaced apart and braced by the frame 11, and which can also be used for fixing the frames 13 and 14 in position along the X direction. This X direction fixing can also be provided by any means carried by one of the studs 15 or 16 and co-operating with the frames 13 and 14 (pilot pin, abutment, . . . ).

In analogous manner, provision can be made for the frames 13 and 14 to constitute X and Z direction locking elements for the frame 11 which would then not co-operate directly with the structure 10 but only via a stud immobilizing it in the Y direction (e.g. a Z axis pilot pin).

The portions of the frames 13 and 14 remote from the uprights 13a and 14a are not immobilized in the Y direction. They can therefore be moved towards each other by exerting force in the Y direction on said front portions. Extensions 13b and 14b parallel to the Y direction and secured to the frames 13 and 14 constitute mutual bearing means between them limiting the extent to which they can move towards each other and, where appropriate, enabling them to be connected together.

FIG. 3 shows some of the elements that have already been described and that are given the same references. In this case, the frame 11 is fitted on one of its faces with means for being taken hold of by a robot 20 for handling purposes. On its other face, the frame 11 possesses clamps for co-operating with the lower panel 3. This co-operation can take place when the frame 11 is put into place in the structure 10 of the station, in which case the lower panel 3 is preassembled to the underbody 1 and to the body sides 4a and 4b which have already been put into place in the structure of the station. These clamps can also constitute means for coupling the frame 11 to the lower panel 3, and that are opened outside the assembly line, the frame 11 then constituting a kind of pallet for transporting the lower panel 3 which is put into place by the robot 20 in the assembly station. It will be observed in this FIG. that the studs 12 co-operate with the frame 11 via four fixing points which make it possible to immobilize the frame 11 completely within the structure 10 both in translation along its X, Y and Z directions and in rotation about them.

The side frame 14 is brought into the station 10 by a robot 21. It rests on the studs 16 and bears against the upright 11b of the frame 11 to which it is locked by means that are not shown. The frame 14 carries the body side 4a. In similar manner, the frame 13 is brought into the station by a robot 22 and rests on the studs 15, and it is pressed against the end upright 11a of the frame 11 and is locked thereto.

It will be understood that the rear portions of the body sides 4a and 4b are thus accurately positioned relative to the underbody, and that this is done in highly rigid manner by means that are simple and lightweight.

The body sides are positioned at the front of the underbody merely by applying thrust F to the frames 13 and 14 towards each other and thus against the rigid engine compartment 2 of the underbody 1.

The body sides are then connected to the underbody, or connection thereof is then completed, by spot welding performed by robots (not shown), and it can be seen that these robots have large access areas for doing their work.

Figure 1:
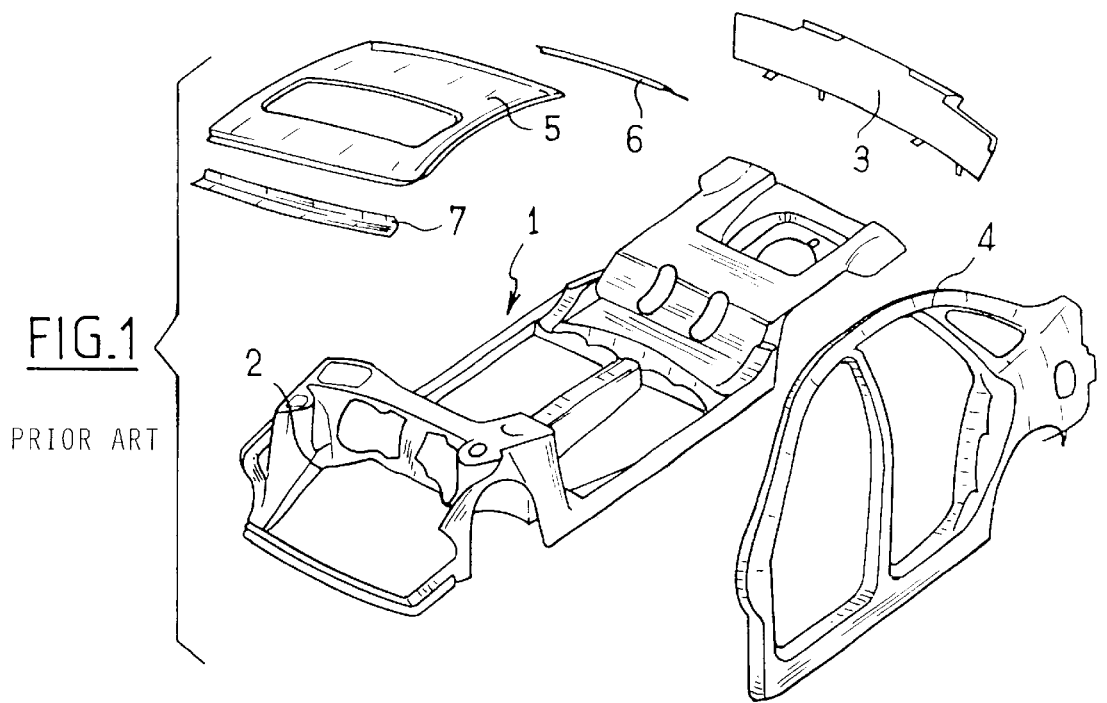

The roof panels and cross-members shown in FIG. 1 can be put into place between the body sides in the same station or in the following station. For this purpose, it suffices to place the roof structure, i.e. the roof panel 5 and the cross-members 6 and 7 between the cant rails (the top portions) of the body sides 4a and 4b by means of a frame, and to move the body sides towards each other and thus against the roof structure, and then to perform welding. There is no point in attempting to determine the shape of the top of the bodywork relative to a fixed reference point since the final shape of this top portion of the bodywork depends on the equilibrium of elastic forces between the roof structure of the vehicle and the top portions of the body sides which are capable of a large amount of elastic deformation.

Like the frame 11 for the lower panel 3, the frames 13 and 14 can operate with the body sides either as handling means for them in order to bring them into the general assembly station, or else as means for determining the shape thereof if the bodywork is brought into the assembly station in a preassembled condition.

What is claimed is:

1. A method of making car bodywork, the method including a step of assembling body sides to an underbody, the underbody including a rigid engine compartment at one end and being placed in an assembly station in a precise position determined in an orthogonal frame of reference having directions X, Y, and Z, the method consisting in putting the body sides into position and holding them in position in the frame of reference of the station by means of two parallel tools each co-operating with a respective body side, and by means of at least one transverse tool extending transversely to said parallel tools, the three tools operating independently and being connected to one another and to the X, Y, Z frame of reference of the station by positioning to the two parallel tools in the direction X and Z of the frame of reference of the station and by placing and holding the transverse tool in a position that is locked in the frame of reference so that said transverse tool forms a spacer and bracing tool in the Y direction from the two parallel tools in a zone that is remote from the engine compartment of the underbody, and the method further consisting of maintaining a force (F) pressing each of the parallel tools at least against the sides of the engine compartment of the underbody while the body sides are being assembled to the underbody.

2. A method according to claim 1, wherein the parallel tools are used as members for bringing the body sides into contact with the underbody.

3. A method according to claim 1, wherein the parallel tools are used as members for holding the body sides in position after they have been lightly tacked to the underbody.

4. A method according to claim 1, wherein the transverse tool is used as a member for bringing in the rear lower panel of the bodywork.

5. A method according to claim 1, wherein the parallel tools are used that possess means for bearing against each other in the Y direction in the vicinity of the engine compartment of the underbody.

* * * * *